(12) United States Patent
Yang

(10) Patent No.: US 8,276,247 B2
(45) Date of Patent: Oct. 2, 2012

(54) SNAP HOOK WITH ROTATABLE LOCK

(75) Inventor: Kai Chieh Yang, Changhua (TW)

(73) Assignee: Gimmal Co., Ltd., Changhua (TW)

( * ) Notice: Subject to any disclaimer, the term of this patent is extended or adjusted under 35 U.S.C. 154(b) by 195 days.

(21) Appl. No.: 12/804,080

(22) Filed: Jul. 13, 2010

(65) Prior Publication Data

US 2012/0011688 A1 Jan. 19, 2012

(51) Int. Cl.
*F16B 45/02* (2006.01)
(52) U.S. Cl. ............ 24/599.9; 24/599.5; 24/600.2; 24/601.1
(58) Field of Classification Search ............ 24/300.7, 24/600.8, 601.1, 601.6, 599.5, 599.9, 600.2; 294/82.19, 82.2
See application file for complete search history.

(56) References Cited

U.S. PATENT DOCUMENTS

| | | | |
|---|---|---|---|
| 680,800 A * | 8/1901 | Munchmeyer | 24/600.7 |
| 684,419 A * | 10/1901 | Farmer | 24/599.2 |
| 1,283,972 A * | 11/1918 | Thomson | 59/85 |
| 1,415,692 A * | 5/1922 | Pavoni | 24/600.2 |
| 1,473,983 A * | 11/1923 | White | 294/82.21 |
| 1,886,726 A * | 11/1932 | Pennefather | 24/600.4 |
| 4,333,212 A | 6/1982 | Bibollet | |
| 4,811,467 A | 3/1989 | Lowe | |
| 5,287,645 A * | 2/1994 | Gois | 43/14 |
| 5,608,953 A | 3/1997 | Petzi et al. | |
| 5,791,025 A | 8/1998 | Maurice et al. | |
| 6,588,076 B1 | 7/2003 | Choate | |
| 7,320,159 B2 * | 1/2008 | Petzl et al. | 24/599.5 |
| 7,624,483 B1 * | 12/2009 | Jang et al. | 24/599.1 |

* cited by examiner

Primary Examiner — Robert J Sandy
Assistant Examiner — Abigail E Morrell
(74) Attorney, Agent, or Firm — Charles E. Baxley

(57) ABSTRACT

A snap hook includes a hook member having a gap formed by an attaching end and a receiving end, a pivotal gate pivotally secured to the hook member and having a notch for receiving the receiving end of the hook member, a locking member is rotatably and slidably engaged onto the pivotal gate and includes a slot for aligning with the notch of the pivotal gate for allowing the pivotal gate and the locking member to be rotated relative to the hook member from the locking position to the unlocking position, and the locking member includes a guiding channel for guiding the locking member to slide longitudinally and to rotate relative to the pivotal gate and the hook member for a limited moving distance and for a limited rotational angle.

10 Claims, 8 Drawing Sheets

SNAP HOOK WITH ROTATABLE LOCK

BACKGROUND OF THE INVENTION

1. Field of the Invention

The present invention relates to a snap hook or S-hook or the like, and more particularly to a snap hook or S-hook including a rotatable safety locking member rotatably attached to a pivotal gate for solidly locking C-shaped hook body and for increasing the locking structure and the locking strength of the snap hook or S-hook and for allowing the snap hook or S-hook to be easily operated by the user.

2. Description of the Prior Art

Typical coupling devices or snap hooks comprise an elongated body member pivotally attached to a handle or loop and including a hook formation formed or provided on one end for engaging with a cable or other objects, and a sleeve rotatably attached onto the elongated body member and movable relative to the elongated body member for selectively locking the hook formation and thus for stably anchoring or locking or securing the cable or other objects to the elongated body member.

For example, U.S. Pat. No. 4,333,212 to Bibollet, and U.S. Pat. No. 4,811,467 to Lowe disclose two of the typical swivel coupling devices comprising a central elongate body member with a hook formation formed or provided on one end and a swivel ring at the other end, and a telescoping sleeve rotatably attached onto the elongated body member and movable relative to the elongated body member for selectively locking the hook formation to form a closed loop and thus for stably anchoring or locking or securing the cable or other objects to the elongated body member.

However, the size or dimension or opening of the hook formation is limited and may not be used to lock the larger objects or the like.

U.S. Pat. No. 5,608,953 to Petzl et al. discloses another typical snap hook comprising a pivoting finger associated to a locking ring movable in rotation between a first locking position and a second unlocking position, and a locking bolt cooperates with the ring to stably or solidly lock the ring positively in the first locking position.

However, the locking ring is rotatable relative to the pivoting finger and may not be moved longitudinally relative to the pivoting finger and thus may not be moved to solidly engage with a C-shaped metallic body.

U.S. Pat. No. 5,791,025 to Maurice et al. discloses a further typical snap hook comprising a pivoting finger with a rotary locking ring cooperating with a locking bolt, and the locking bolt includes an operating component designed to cooperate alternately with a notch that is formed and arranged in the locking ring and movable in rotation between a first locking position and a second unlocking position.

However, similarly, the locking ring is rotatable relative to the pivoting finger and may not be moved longitudinally relative to the pivoting finger and thus may not be moved to solidly engage with a C-shaped metallic body.

U.S. Pat. No. 6,588,076 to Choate discloses a still further typical snap hook comprising a pivoting finger with a rotary locking ring cooperating with a locking bolt, and the locking bolt includes an operating component designed to cooperate alternately with a notch that is formed and arranged in the locking ring and movable in rotation between a first locking position and a second unlocking position.

However, the cylindrical locking element is required to form a longitudinal slot therein for slidably engaging with an outward leg, and the longitudinal slot that is formed in the cylindrical locking element extends for more than one half of the length of the cylindrical locking element and may greatly reduce the strength of the typical snap hook when the typical snap hook is subjected with a side force.

The present invention has arisen to mitigate and/or obviate the afore-described disadvantages of the conventional snap hooks or S-hooks.

SUMMARY OF THE INVENTION

The primary objective of the present invention is to provide a snap hook including a rotatable safety locking member rotatably attached to a pivotal gate and movable to engage with one end of a C-shaped hook body for solidly securing or locking the C-shaped hook body and for increasing the locking structure and the locking strength of the snap hook or S-hook and for allowing the snap hook or S-hook to be easily operated by the user.

In accordance with one aspect of the invention, there is provided a snap hook comprising a hook member including a space formed therein, and including a gap formed therein and communicating with the space of the hook member for forming an attaching end and a receiving end, and including an opening formed in the receiving end for forming a first latch member in the receiving end, a pivotal gate including a first end pivotally secured to the attaching end of the hook member with an axle for allowing the pivotal gate to be rotated relative to the hook member between a locking position and an unlocking position, the pivotal gate including a notch formed in the first end thereof for receiving the attaching end and including a second end having an opening formed therein for forming a second latch member in the second end of the pivotal gate and for selectively engaging with the first latch member of the hook member, a locking member including a bore formed therein for rotatably receiving and engaging onto the pivotal gate, and including a slot formed in a first end of the locking member for selectively aligning with the notch of the pivotal gate and the attaching end of the hook member and for allowing the pivotal gate and the locking member to be rotated relative to the hook member from the locking position to the unlocking position, and the locking member being movable relative to the pivotal gate for selectively receiving and engaging the first latch member of the hook member and the second latch member of the pivotal gate in a second end of the locking member, and for selectively disengaging the second end of the locking member from the first latch member of the hook member and the second latch member of the pivotal gate, and a spring member engaged with the pivotal gate and the locking member for forcing and biasing the locking member to rotate relative to the pivotal gate, and for disengaging and offsetting the slot of the locking member from the notch of the pivotal gate, and for anchoring and retaining the first latch member of the hook member and the second latch member of the pivotal gate in the second end of the locking member, and for locking and retaining and latching the pivotal gate to the hook member at the locking position.

The locking member includes a guiding channel formed in the locking member, and the axle includes a head extended out of the pivotal gate and slidably received and engaged in the guiding channel of the locking member for guiding and limiting the locking member to rotate relative to the pivotal gate and the hook member for a limited rotational angle and to move longitudinally relative to the pivotal gate and the hook member for a limited moving distance "D", and for controlling the slot of the locking member either in alignment with the notch of the pivotal gate or offset from the channel of the pivotal gate.

The guiding channel of the locking member includes a longitudinal passage, a lateral passage communicative with a lower portion of the longitudinal passage, and a seating recess communicative with an upper portion of the longitudinal passage of the locking member.

The pivotal gate includes an aperture formed therein for receiving a first end of the spring member, and the locking member includes a slit formed therein for engaging with a second end of the spring member.

The pivotal gate includes a peripheral shoulder formed therein for engaging with the spring member, and the locking member includes an inner peripheral shoulder formed therein for engaging with the spring member, and the spring member is preferably a coil spring member engaged between the pivotal gate and the locking member.

The hook member includes a latching notch formed in the receiving end of the hook member and communicative with the opening of the hook member for forming an anchoring catch in the receiving end of the hook member, and the pivotal gate includes a latching notch formed in the second end of the pivotal gate for forming an anchoring catch in the second end of the pivotal gate and for selectively engaging with the anchoring catch and the latching notch of the hook member respectively and for solidly and stably anchoring and latching the pivotal gate to the hook member at the locking position.

The pivotal gate includes a spring biased positioning member engaged in the first end of the pivotal gate and engagable with the attaching end of the hook member for selectively biasing and positioning the pivotal gate to the hook member at the unlocking position.

The pivotal gate includes a cavity formed in the first end of the pivotal gate for receiving a spring member of the spring biased positioning member. The hook member includes an inclined surface formed in the attaching end of the hook member for selectively engaging with the spring biased positioning member, or the hook member may include a positioning notch formed in the attaching end for selectively engaging with the spring biased positioning member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
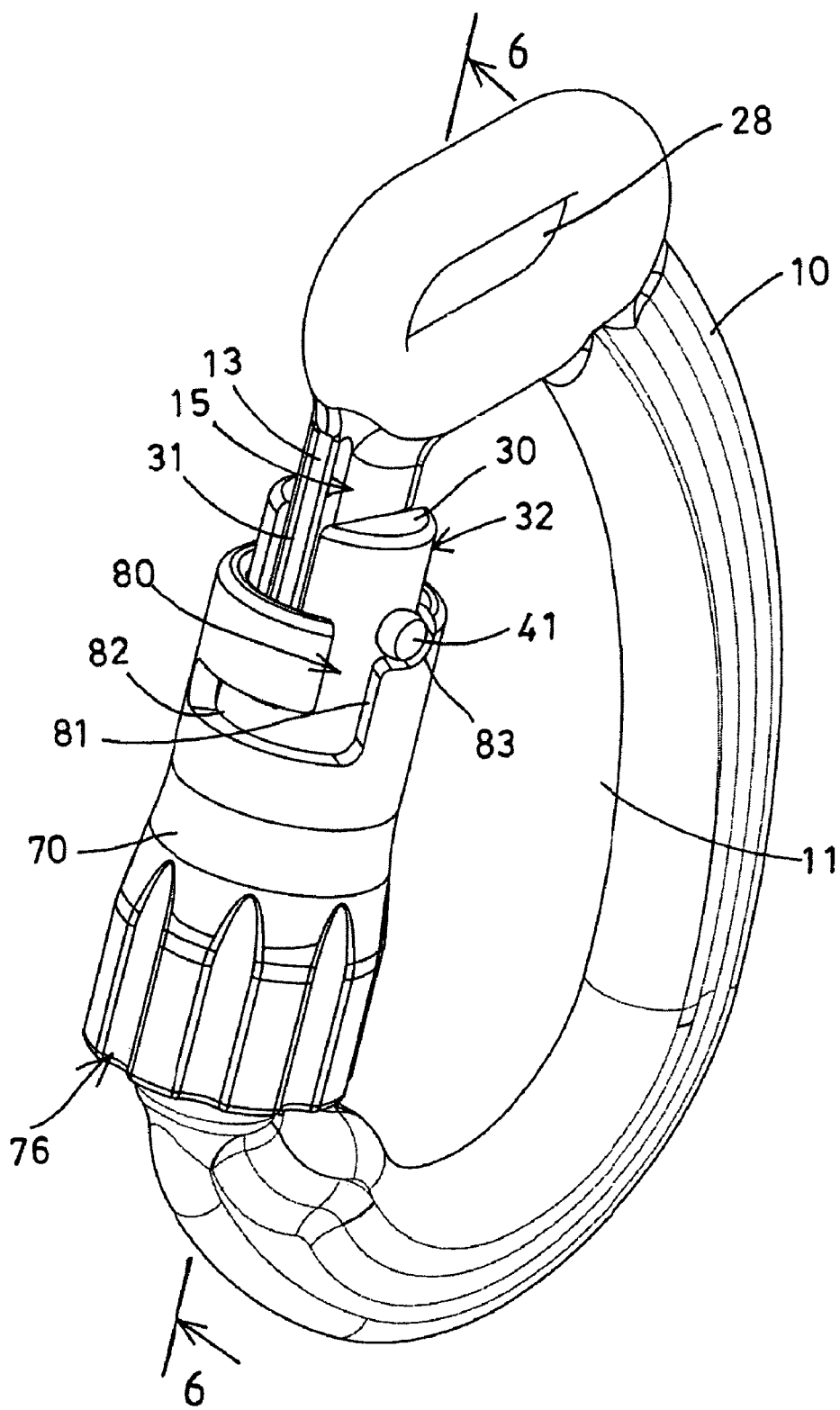
FIG. 1 is a perspective view of a snap hook in accordance with the present invention.

Referring to the drawings, and initially to FIGS. 1-6, a snap hook in accordance with the present invention comprises a C-shaped hook body or member 10 including a space 11 formed therein for receiving one or more cables (not shown) or other objects, and including a gap 12 formed therein and communicating with the space 11 thereof for forming or defining two free ends 13, 14, such as a first or attaching end 13 and a second or receiving end 14. It is preferable that the C-shaped hook member 10 is bent or formed with an elongated rod which includes a circular or substantially circular or non-circular cross section, and the hook member 10 includes one or more cut-off portions 15 formed in one of the free ends 13 or the first or attaching end 13 for forming a flat structure or a square or rectangular cross section for the free end 13.

The hook member 10 further includes an orifice 16 formed in one end 13, such as formed in the attaching end 13 thereof, and further includes an inclined surface 17 formed in the lower portion of the attaching end 13, and further includes an anchoring or positioning notch 18 also formed in the attaching end 13 and offset from the inclined surface 17. The other or second end or the receiving end 14 of the hook member 10 preferably includes a circular cross section, and includes a cut-off portion or opening 20 formed in the receiving end 14 for forming or defining a latch member 21, in which the opening 20 and the latch member 21 each preferably include a semi-circular cross section, the hook member 10 further includes a latching notch 22 formed in the receiving end 14 thereof and communicative with the opening 20 of the hook member 10 for forming or defining an anchoring catch 23 on the receiving end 14 thereof. The hook member 10 may include a ring or loop 28 for hooking or hanging purposes.

Figure 2:
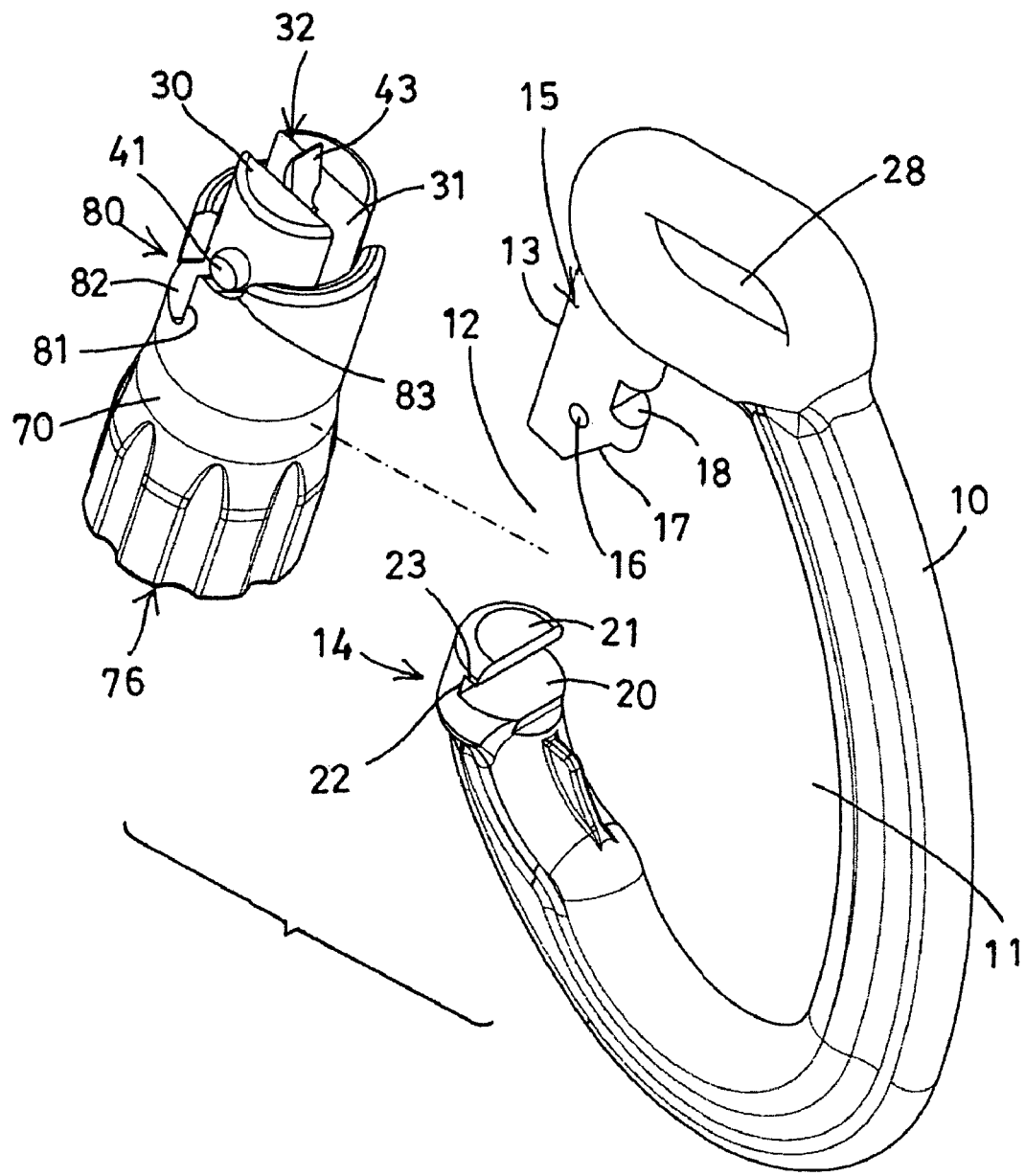
FIG. 2 is a partial exploded view of the snap hook.
Figure 3:
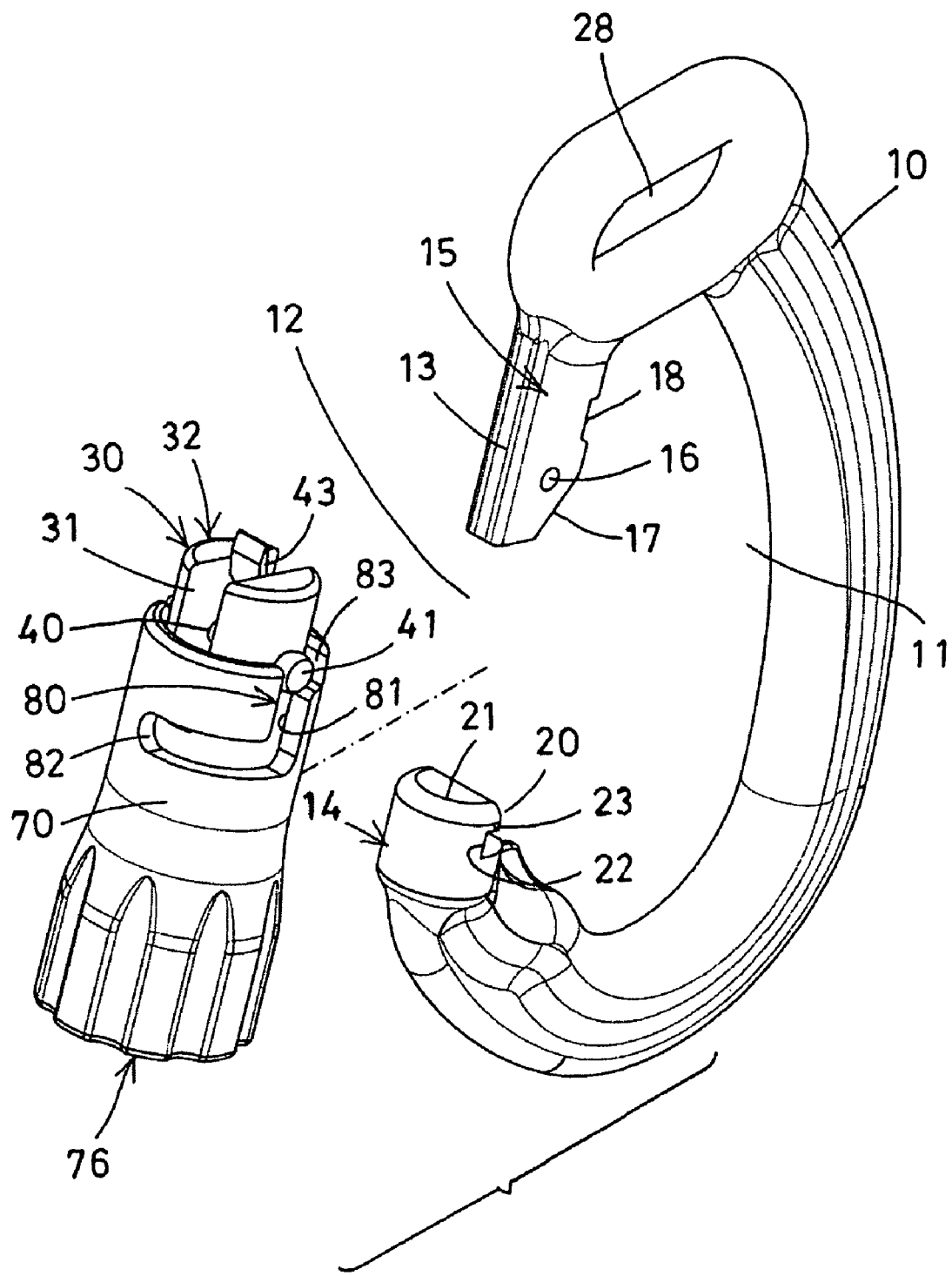
FIG. 3 is another partial exploded view of the snap hook as seen from a different angle to that shown in FIG. 2.
Figures 4, 5:
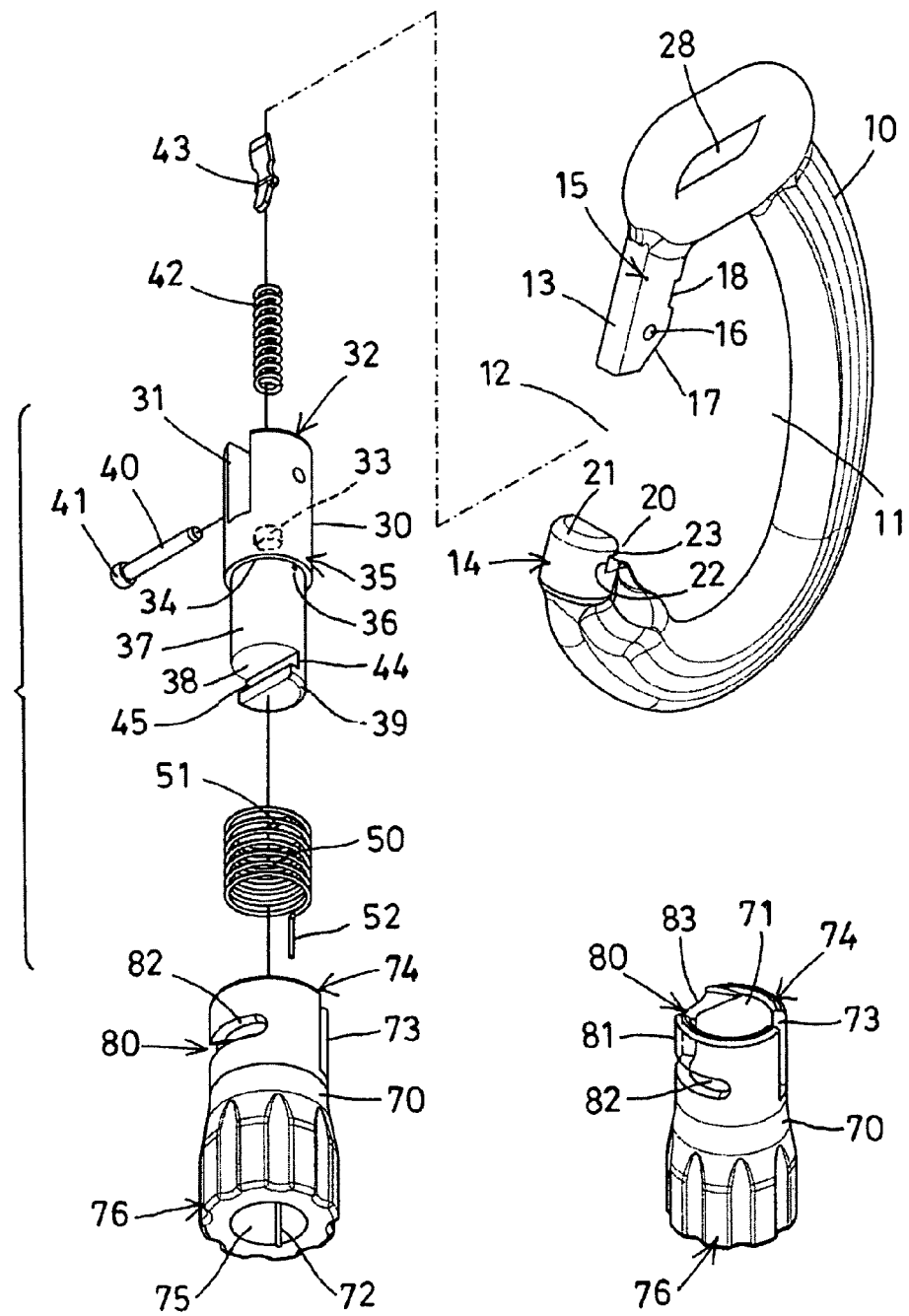
FIG. 4 is a further partial exploded view of the snap hook.
FIG. 5 is a perspective view illustrating a cylindrical safety locking member of the snap hook.
Figure 8:
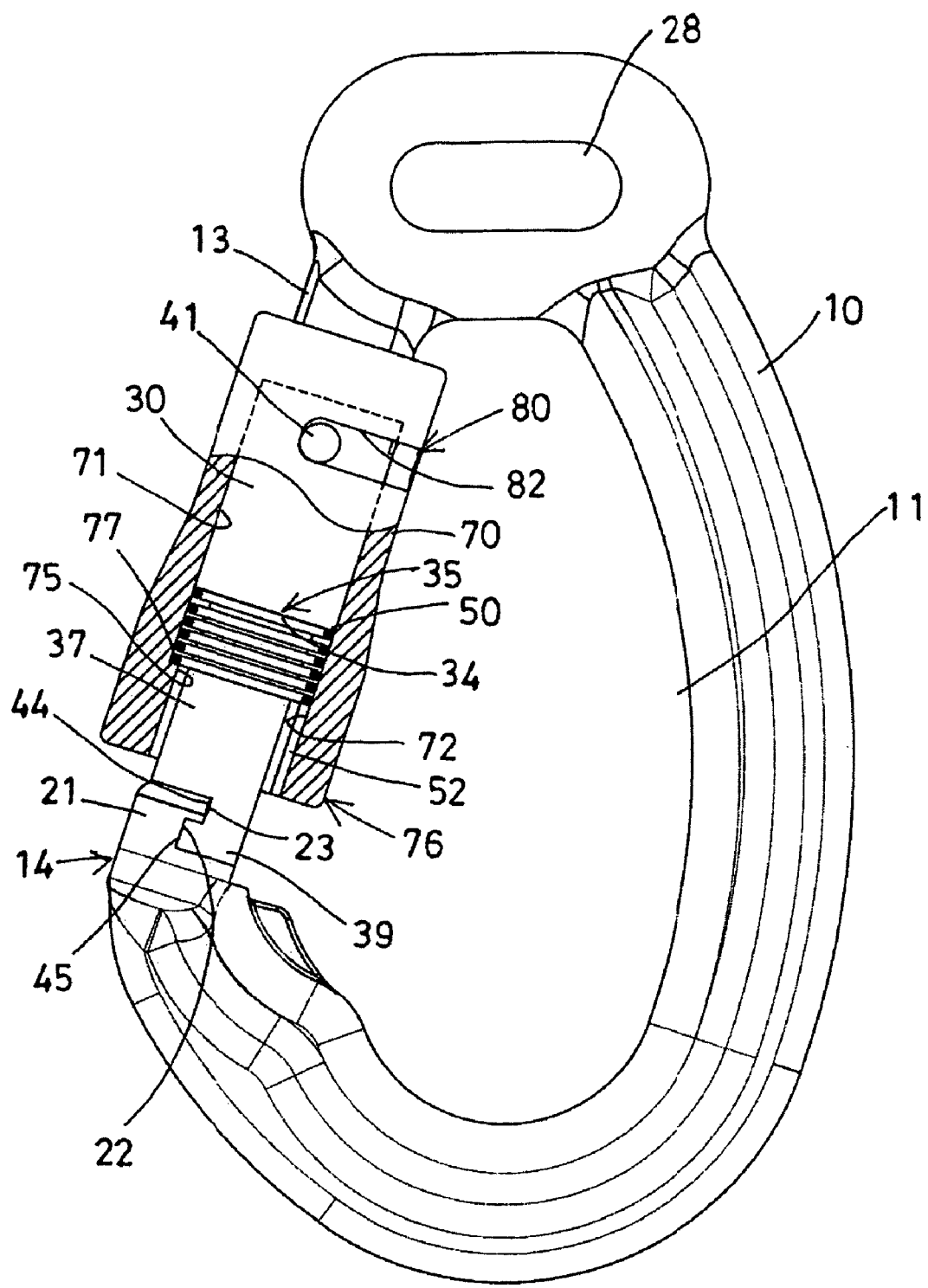
Figure 9:
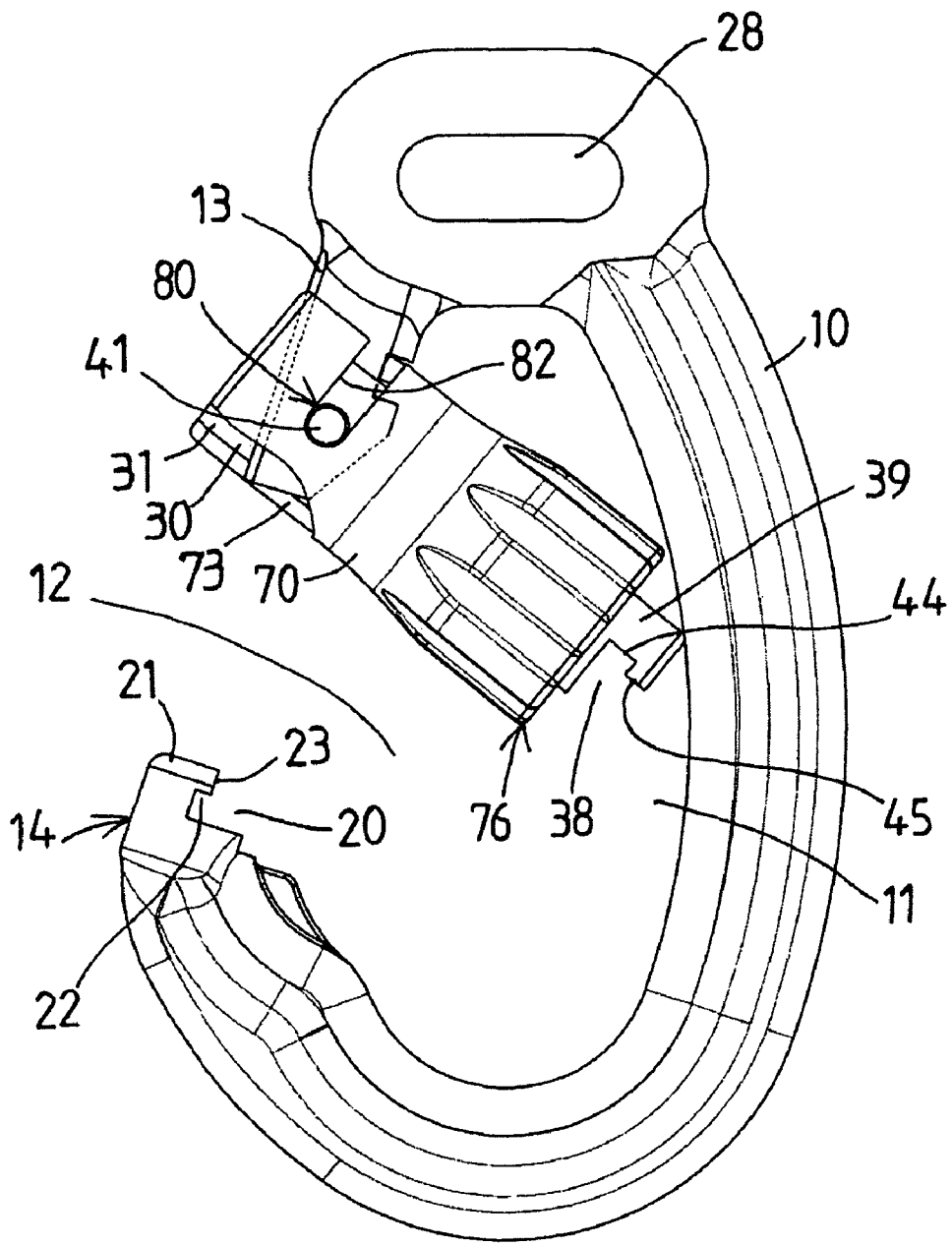
FIG. 9 is a side plan schematic view illustrating the operation of the snap hook.

A pivotal shank or gate 30 includes a notch 31 formed in one or first end 32 thereof for receiving the attaching end 13 of the hook member 10, an axle 40 is attached to the first end 32 of the pivotal gate 30 and engaged through the notch 31 of the pivotal gate 30 and further engaged through the orifice 16 at the attaching end 13 of the hook member 10 for pivotally or rotatably attaching or securing the pivotal gate 30 to the hook member 10 and for allowing the pivotal gate 30 to be rotated relative to the hook member 10 between a first locking position (FIGS. 1, 6-8) and a second unlocking position (FIG. 9). The axle 40 includes an enlarged end or head 41 formed in one end thereof. The pivotal gate 30 further includes a cavity 33 formed in the first end 32 thereof (FIG. 4) for receiving a spring member 42 and/or a spring blade or positioning member 43 (FIGS. 2-4).

The spring blade or positioning member 43 may be biased by the spring member 42 to engage with the attaching end 13 of the hook member 10 for biasing and anchoring or positioning the pivotal gate 30 to the hook member 10 at the first locking position (FIGS. 1, 6-8), and the positioning member 43 may be biased by the spring member 42 to slidably engage with the inclined surface 17 and then to selectively engage with the positioning notch 18 of the hook member 10 for anchoring or positioning the pivotal gate 30 to the hook member 10 at the second unlocking position (FIG. 9). The pivotal gate 30 further includes a peripheral recess or shoulder 34 formed in the middle portion 35 thereof for receiving or engaging with a spring biasing means or device or a spring member 50, such as a coil spring member 50 which may be engaged onto the pivotal gate 30 engaged with the peripheral shoulder 34 of the pivotal gate 30.

The pivotal gate 30 further includes an aperture 36 formed in the middle portion 35 thereof for receiving or engaging with one end or first leg member 51 of the spring biasing means or device or spring member 50, and includes a cut-off portion or opening 38 formed in the other or second or latching end 37 thereof for selectively receiving or engaging with the latch member 21 at the receiving end 14 of the hook member 10 and for forming or defining another latch member 39, in which the opening 38 and the latch member 39 each also preferably include a semi-circular cross section, the pivotal gate 30 further includes a latching notch 44 formed in the latching end 37 thereof and communicative with the opening 38 of the pivotal gate 30 for forming or defining an anchoring catch 45 and for selectively engaging with the anchoring catch 23 and/or the latching notch 22 of the hook member 10 respectively.

Figure 6:
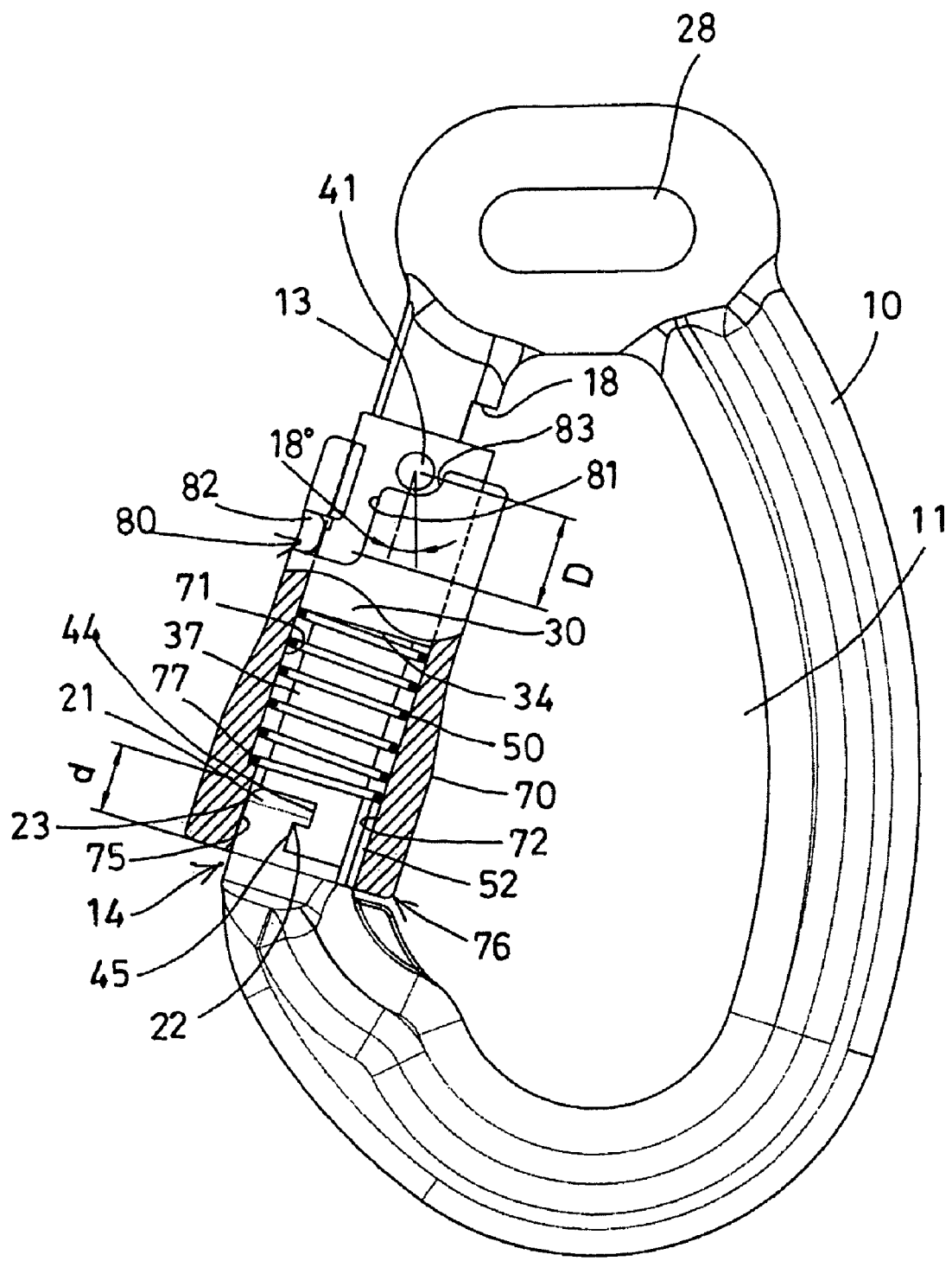
FIG. 6 is a partial cross sectional view of the snap hook taken along lines 6-6 of FIG. 1.
Figure 7:
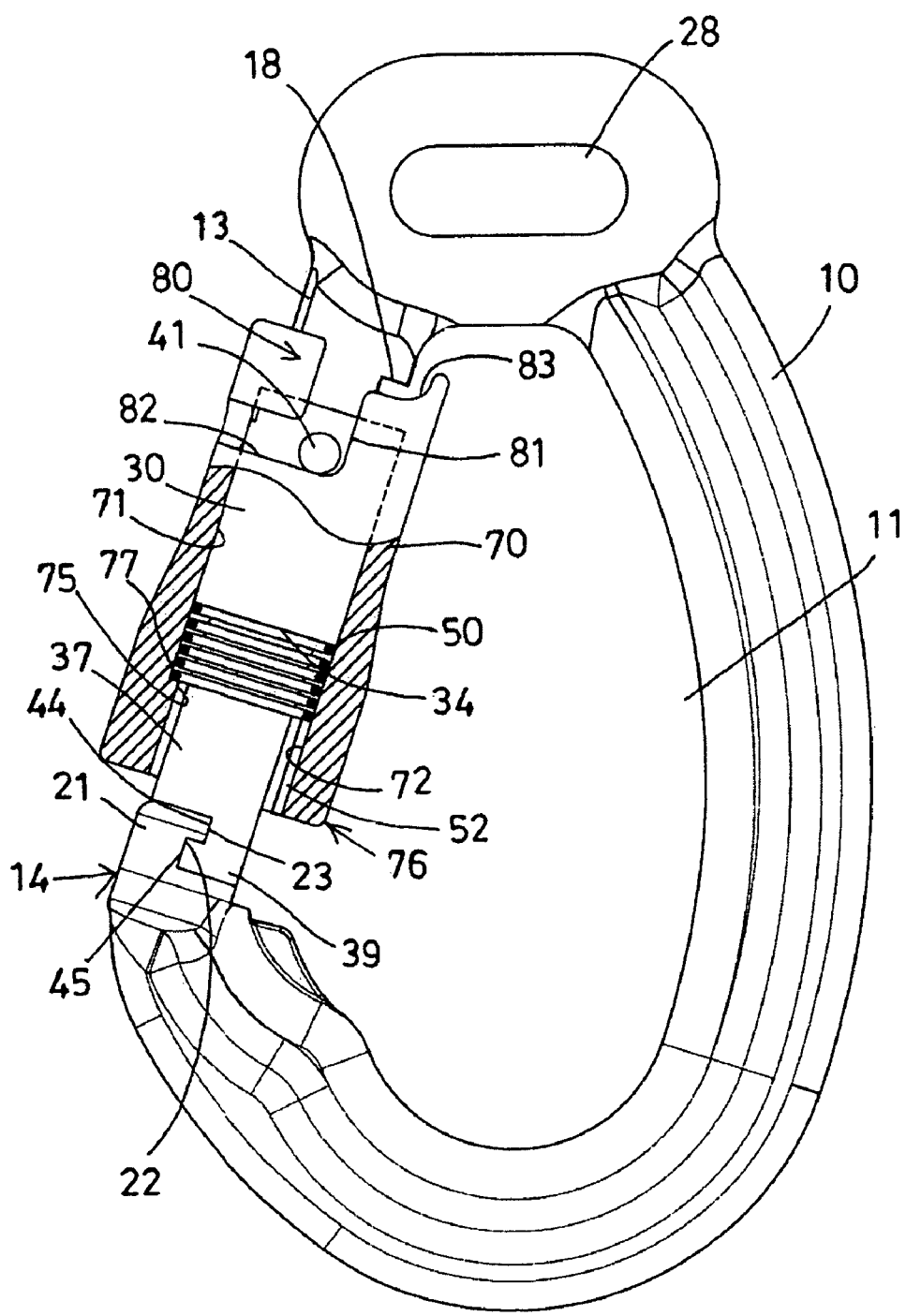
FIGS. 7, 8 are further partial cross sectional views of the snap hook similar to FIG. 6, illustrating the operation of the snap hook.

In operation, as shown in FIGS. 6-8, the latch member 39 of the pivotal gate 30 is contactable or engageable with the latch member 21 of the hook member 10, or the anchoring catch 45 of the pivotal gate 30 is engageable with the latching notch 22 of the hook member 10, or the anchoring catch 23 of the hook member 10 is engageable with the latching notch 44 of the pivotal gate 30 for anchoring or latching the pivotal gate 30 to the hook member 10 at the first locking position (FIGS. 1, 6-8). The pivotal gate 30 may also be pivoted or rotated relative to the hook member 10 to the second unlocking position (FIG. 9) for selectively disengaging the latch member 39 of the pivotal gate 30 from the latch member 21 of the hook member 10 and for allowing the cables or other objects to be engaged through the gap 12 and into the space 11 of the hook member 10.

The snap hook further includes a rotatable sleeve or tubular or cylindrical safety locking member 70 having a bore 71 formed therein for rotatably receiving or engaging onto the pivotal gate 30 and rotatable relative to the pivotal gate 30, the safety locking member 70 includes a slit 72 formed therein (FIGS. 4, 6-8) for receiving or engaging with the other or second leg member 52 of the spring member 50 which may be engaged or coupled between the pivotal gate 30 and the safety locking member 70 for forcing or biasing the safety locking member 70 to rotate relative to the pivotal gate 30 and to stably or solidly lock or retain the pivotal gate 30 to the hook member 10 at the first locking position (FIGS. 1, 6) and thus for preventing the pivotal gate 30 from being rotated away from the hook member 10 to the second unlocking position as shown in FIG. 9.

The safety locking member 70 includes a slot 73 formed in one or first end 74 thereof for selectively aligning with the notch 31 of the pivotal gate 30 and the attaching end 13 of the hook member 10 and for allowing the pivotal gate 30 and the safety locking member 70 to be rotated relative to the hook member 10 between the first locking position (FIGS. 1, 6-8) and the second unlocking position (FIG. 9), and includes a chamber 75 formed in the other or second end 76 thereof and having an inner diameter slightly smaller than that of the bore 71 of the safety locking member 70 for forming or defining an inner peripheral shoulder 77 therein (FIGS. 6-8) and for engaging with the spring member 50, and thus for stably anchoring and retaining the spring member 50 in the bore 71 of the safety locking member 70.

The chamber 75 of the safety locking member 70 includes an inner diameter equal to or slightly greater than that of the latching end 37 of the pivotal gate 30 and the receiving end 14 of the hook member 10 for snugly receiving or engaging with the latching end 37 of the pivotal gate 30 and the receiving end 14 of the hook member 10, and also for snugly receiving or engaging with the latch member 39 of the pivotal gate 30 and the latch member 21 of the hook member 10 when the latch member 39 of the pivotal gate 30 and the latch member 21 of the hook member 10 are contacted or engaged with each other (FIG. 6), and thus for stably and solidly anchoring and retaining or locking the pivotal gate 30 and the safety locking member 70 to the hook member 10 at the first locking position.

The safety locking member 70 is movable or slidable longitudinally relative to the pivotal gate 30 for selectively disengaging from the latch member 39 of the pivotal gate 30 and the latch member 21 of the hook member 10 and for allowing the latch member 39 of the pivotal gate 30 to be selectively moved or disengaged from the latch member 21 of the hook member 10 and for allowing the pivotal gate 30 and the safety locking member 70 to be rotated relative to the hook member 10 from the first locking position to the second unlocking position as shown in FIG. 9. The spring member 50 may force or bias the safety locking member 70 to rotate relative to the pivotal gate 30 and to move or disengage or offset the slot 73 of the safety locking member 70 from the notch 31 of the pivotal gate 30 and to stably anchor and retain the attaching end 13 of the hook member 10 within the notch 31 of the pivotal gate 30 and to stably anchor and retain the receiving end 14 of the hook member 10 and the second end 37 and the latch member 39 of the pivotal gate 30 within the chamber 75 of the safety locking member 70, and thus to stably or solidly anchor or position or lock or retain the pivotal gate 30 to the hook member 10 at the first locking position.

It is preferable that the safety locking member 70 further includes an L or N or S-shaped guiding channel 80 formed in the one or first end 74 of the safety locking member 70, and the guiding channel 80 of the safety locking member 70 includes a longitudinal member or segment or portion or passage 81, a lateral member or segment or portion or passage 82 formed or intersected or communicative with the lower portion of the longitudinal passage 81, and a seating member or recess 83 formed or intersected or communicative with the upper portion of the longitudinal passage 81, and the axle 40 may include one end or enlarged end or head 41 formed therein and extended out of the pivotal gate 30 and slidably received and engaged in the guiding channel 80 of the safety locking member 70 for guiding and limiting the safety locking member 70 to rotate relative to the pivotal gate 30 and the hook member 10 for a limited rotational angle, and for controlling the slot 73 of the safety locking member 70 either in alignment with the notch 31 of the pivotal gate 30 or offset from the notch 31 of the pivotal gate 30.

It is to be noted that the safety locking member 70 may slide longitudinally relative to the pivotal gate 30 and may also rotate relative to the pivotal gate 30 and the hook member 10 such that the length of the safety locking member 70 may be suitably reduced, or the length of the safety locking member 70 is not required to be increased, and the safety locking member 70 is only required to be rotated relative to the pivotal gate 30 and the hook member 10 by the hand of the user that holds the hook member 10 such that the snap hook may be easily operated by the single hand of the user. It is further to be noted that the safety locking member 70 may be formed shorter to have the other or second end 76 of the safety locking member 70 good enough to selectively or solidly latch or lock the pivotal gate 30 to the hook member 10 at the first locking position.

In operation, the safety locking member 70 may first be slightly rotated relative to the pivotal gate 30 and the hook member 10 to disengage the head 41 of the axle 40 from the seating recess 83 of the guiding channel 80 of the safety locking member 70 and to align the head 41 of the axle 40 with the longitudinal passage 81 of the guiding channel 80 of the safety locking member 70, and thus to allow the safety locking member 70 to move or slide relative to the pivotal gate 30 and the hook member 10 for a limited moving distance "D" (FIG. 6), which is slightly greater than the height "d" of the receiving end 14 of the hook member 10 or the contacting or engaging portions or segments between the latch members 21, 39 of the hook member 10 and the pivotal gate 30, in order to disengage the safety locking member 70 from the latch member 39 of the pivotal gate 30 and the latch member 21 of the hook member 10 (FIG. 7).

As shown in FIGS. 7 and 8, when the head 41 of the axle 40 is moved to the lower portion of the longitudinal passage 81 and aligned with the lateral passage 82 of the guiding channel 80 of the safety locking member 70, the safety locking member 70 may be further rotated relative to the pivotal gate 30 and the hook member 10 for a limited rotational angle to engage the head 41 of the axle 40 to the dead end portion of the lateral passage 82 of the guiding channel 80 of the safety locking member 70 and to selectively align the slot 73 of the safety locking member 70 with the notch 31 of the pivotal gate 30, and thus to allow the pivotal gate 30 and the safety locking member 70 to be rotated relative to the hook member 10 from the locking position (FIG. 8) to the unlocking position (FIG. 9).

When it is required to latch or lock the pivotal gate 30 to the hook member 10, it is only required to release the safety locking member 70, and the spring member 50 may bias and force and rotate the safety locking member 70 relative to the pivotal gate 30 and the hook member 10, in order to move the head 41 of the axle 40 from the lateral passage 82 through the longitudinal passage 81 of the guiding channel 80 of the safety locking member 70, so as to disengage or offset the slot 73 of the safety locking member 70 from the notch 31 of the pivotal gate 30 and to force the head 41 of the axle 40 to selectively move or to selectively engage into the seating recess 83 of the guiding channel 80 of the safety locking member 70.

At this moment, the attaching end 13 of the hook member 10 may be stably anchored and retained within the notch 31 of the pivotal gate 30, and the receiving end 14 of the hook member 10 may be stably anchored and retained within the chamber 75 of the safety locking member 70, and the receiving end 14 and the latch members 21, 39 of the hook member 10 and the pivotal gate 30 may be stably anchored and retained within the other or second end 76 or the chamber 75 of the safety locking member 70, and thus the pivotal gate 30 may be stably and solidly anchored and retained and latched or locked to the hook member 10 at the first locking position (FIGS. 1, 6).

Accordingly, the snap hook in accordance with the present invention includes a rotatable safety locking member rotatably attached to the pivotal gate and movable to engage with one end of the C-shaped hook body for solidly securing or locking the C-shaped hook body and for increasing the locking structure of the snap hook or S-hook and for allowing the snap hook or S-hook to be easily operated by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A snap hook comprising:
    a hook member including a space formed therein, and including a gap formed therein and communicating with said space of said hook member for forming an attaching end and a receiving end, and including an opening formed in said receiving end for forming a first latch member in said receiving end,
    a pivotal gate including a first end pivotally secured to said attaching end of said hook member with an axle for allowing said pivotal gate to be rotated relative to said hook member between a locking position and an unlocking position, said pivotal gate including a notch formed in said first end thereof for receiving said attaching end and including a second end having an opening formed therein for forming a second latch member in said second end of said pivotal gate and for selectively engaging with said first latch member of said hook member,
    a locking member including a bore formed therein for rotatably receiving and engaging onto said pivotal gate, and including a slot formed in a first end of said locking member for selectively aligning with said notch of said pivotal gate and said attaching end of said hook member and for allowing said pivotal gate and said locking member to be rotated relative to said hook member from the locking position to the unlocking position, and said locking member being movable relative to said pivotal gate for selectively receiving and engaging said first latch member of said hook member and said second latch member of said pivotal gate in a second end of said locking member, and for selectively disengaging said second end of said locking member from said first latch member of said hook member and said second latch member of said pivotal gate, and
    a spring member engaged with said pivotal gate and said locking member for forcing and biasing said locking member to rotate relative to said pivotal gate, and for disengaging and offsetting said slot of said locking member from said notch of said pivotal gate, and for anchoring and retaining said first latch member of said hook member and said second latch member of said pivotal gate in said second end of said locking member, and for locking and retaining and latching said pivotal gate to said hook member at the locking position, and
    said pivotal gate including a peripheral shoulder formed therein for engaging with said spring member, and said locking member including an inner peripheral shoulder formed therein for engaging with said spring member.

2. The snap hook as claimed in claim 1, wherein said pivotal gate includes an aperture formed therein for receiving a first end of said spring member, and said locking member includes a slit formed therein for engaging with a second end of said spring member.

3. The snap hook as claimed in claim 1, wherein said spring member is a coil spring engaged between said pivotal gate and said locking member.

4. A snap hook comprising:
    a hook member including a space formed therein, and including a gap formed therein and communicating with said space of said hook member for forming an attaching end and a receiving end, and including an opening formed in said receiving end for forming a first latch member in said receiving end,
    a pivotal gate including a first end pivotally secured to said attaching end of said hook member with an axle for allowing said pivotal gate to be rotated relative to said hook member between a locking position and an unlocking position, said pivotal gate including a notch formed in said first end thereof for receiving said attaching end and including a second end having an opening formed therein for forming a second latch member in said second end of said pivotal gate and for selectively engaging with said first latch member of said hook member,
    a locking member including a bore formed therein for rotatably receiving and engaging onto said pivotal gate, and including a slot formed in a first end of said locking member for selectively aligning with said notch of said pivotal gate and said attaching end of said hook member and for allowing said pivotal gate and said locking member to be rotated relative to said hook member from the locking position to the unlocking position, said locking member including a guiding channel formed in said locking member, and said axle including a head extended out of said pivotal gate and slidably received and engaged in said guiding channel of said locking member for guiding and limiting said locking member to rotate relative to said pivotal gate and said hook member for a limited rotational angle and to move longitudinally relative to said pivotal gate and said hook member for a limited moving distance "D", and for controlling said slot of said locking member either in alignment with said notch of said pivotal gate or offset from said channel of said pivotal gate, said locking member being movable relative to said pivotal gate for selectively receiving and engaging said first latch member of said hook member and said second latch member of said pivotal gate in a second end of said locking member, and for selectively disengaging said second end of said locking member from said first latch member of said hook member and said second latch member of said pivotal gate, and a spring member engaged with said pivotal gate and said locking member for forcing and biasing said locking member to rotate relative to said pivotal gate, and for disengaging and offsetting said slot of said locking member from said notch of said pivotal gate, and for anchoring and retaining said first latch member of said hook member and said second latch member of said pivotal gate in said second end of said locking member, and for locking and retaining and latching said pivotal gate to said hook member at the locking position.

5. The snap hook as claimed in claim 4, wherein said guiding channel of said locking member includes a longitudinal passage, a lateral passage communicative with a lower portion of said longitudinal passage, and a seating recess communicative with an upper portion of said longitudinal passage of said locking member.

6. A snap hook comprising:

a hook member including a space formed therein, and including a gap formed therein and communicating with said space of said hook member for forming an attaching end and a receiving end, and including an opening formed in said receiving end for forming a first latch member in said receiving end, said hook member including a latching notch formed in said receiving end of said hook member and communicative with said opening of said hook member for forming an anchoring catch in said receiving end of said hook member, a pivotal gate including a first end pivotally secured to said attaching end of said hook member with an axle for allowing said pivotal gate to be rotated relative to said hook member between a locking position and an unlocking position, said pivotal gate including a notch formed in said first end thereof for receiving said attaching end and including a second end having an opening formed therein for forming a second latch member in said second end of said pivotal gate and for selectively engaging with said first latch member of said hook member, and said pivotal gate including a latching notch formed in said second end of said pivotal gate for forming an anchoring catch in said second end of said pivotal gate and for selectively engaging with said anchoring catch and said latching notch of said hook member respectively and for anchoring and latching said pivotal gate to said hook member at the locking position, a locking member including a bore formed therein for rotatably receiving and engaging onto said pivotal gate, and including a slot formed in a first end of said locking member for selectively aligning with said notch of said pivotal gate and said attaching end of said hook member and for allowing said pivotal gate and said locking member to be rotated relative to said hook member from the locking position to the unlocking position, and said locking member being movable relative to said pivotal gate for selectively receiving and engaging said first latch member of said hook member and said second latch member of said pivotal gate in a second end of said locking member, and for selectively disengaging said second end of said locking member from said first latch member of said hook member and said second latch member of said pivotal gate, and a spring member engaged with said pivotal gate and said locking member for forcing and biasing said locking member to rotate relative to said pivotal gate, and for disengaging and offsetting said slot of said locking member from said notch of said pivotal gate, and for anchoring and retaining said first latch member of said hook member and said second latch member of said pivotal gate in said second end of said locking member, and for locking and retaining and latching said pivotal gate to said hook member at the locking position.

7. A snap hook comprising:

a hook member including a space formed therein, and including a gap formed therein and communicating with said space of said hook member for forming an attaching end and a receiving end, and including an opening formed in said receiving end for forming a first latch member in said receiving end, a pivotal gate including a first end pivotally secured to said attaching end of said hook member with an axle for allowing said pivotal gate to be rotated relative to said hook member between a locking position and an unlocking position, said pivotal gate including a notch formed in said first end thereof for receiving said attaching end and including a second end having an opening formed therein for forming a second latch member in said second end of said pivotal gate and for selectively engaging with said first latch member of said hook member, said pivotal gate including a spring biased positioning member engaged in said first end of said pivotal gate and engageble with said attaching end of said hook member for biasing and positioning said pivotal gate to said hook member at the unlocking position, a locking member including a bore formed therein for rotatably receiving and engaging onto said pivotal gate, and including a slot formed in a first end of said locking member for selectively aligning with said notch of said pivotal gate and said attaching end of said hook member and for allowing said pivotal gate and said locking member to be rotated relative to said hook member from the locking position to the unlocking position, and said locking member being movable relative to said pivotal gate for selectively receiving and engaging said first latch member of said hook member and said second latch member of said pivotal gate in a second end of said locking member, and for selectively disengaging said second end of said locking member from said first latch member of said hook member and said second latch member of said pivotal gate, and a spring member engaged with said pivotal gate and said locking member for forcing and biasing said locking member to rotate relative to said pivotal gate, and for disengaging and offsetting said slot of said locking member from said notch of said pivotal gate, and for anchoring and retaining said first latch member of said hook member and said second latch member of said pivotal gate in said second end of said locking member, and for locking and retaining and latching said pivotal gate to said hook member at the locking position.

8. The snap hook as claimed in claim 7, wherein said pivotal gate includes a cavity formed in said first end of said pivotal gate for receiving a spring member of said spring biased positioning member.

9. The snap hook as claimed in claim 7, wherein said hook member includes an inclined surface formed in said attaching end of said hook member for selectively engaging with said spring biased positioning member.

10. The snap hook as claimed in claim 7, wherein said hook member includes a positioning notch formed in said attaching end for selectively engaging with said spring biased positioning member.

* * * * *